_United States Patent Office_

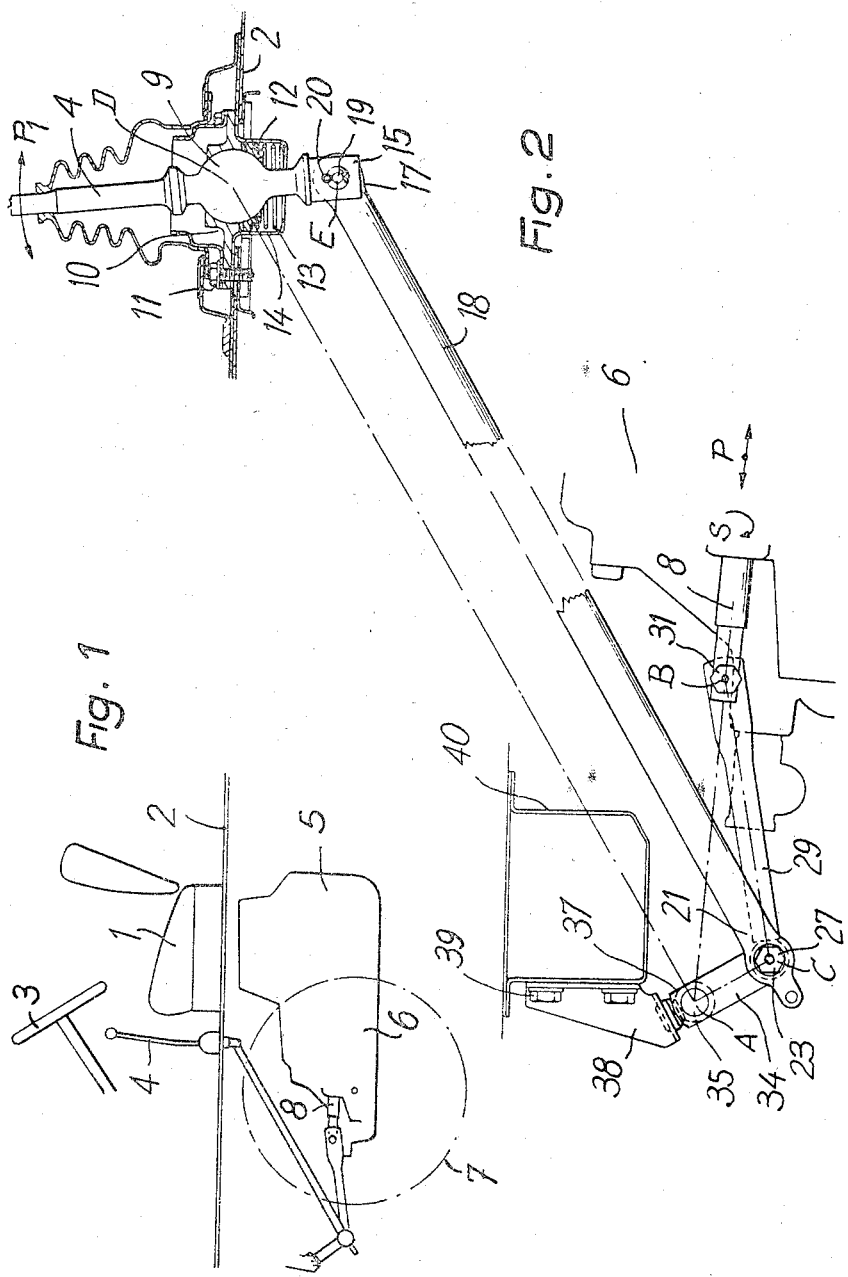

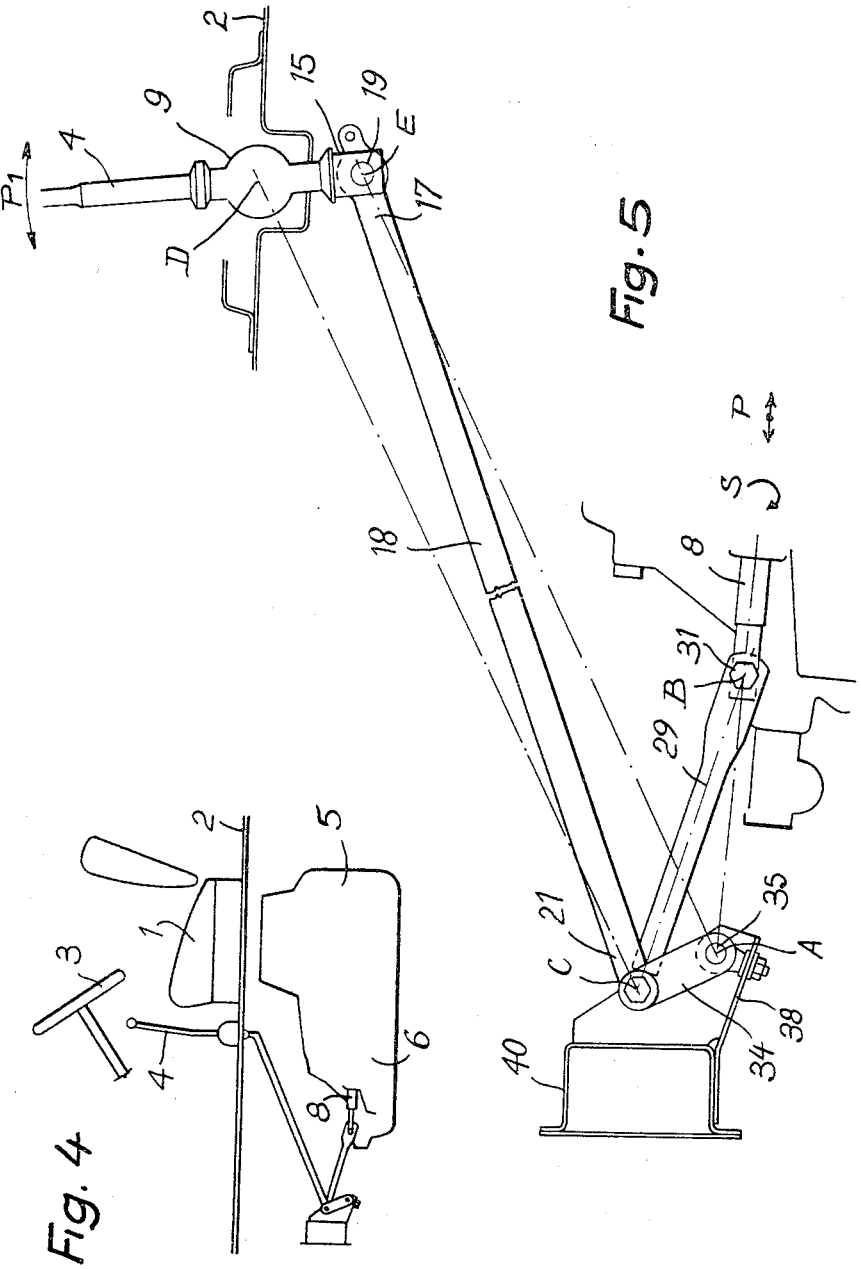

3,489,028
Patented Jan. 13, 1970

3,489,028
GEARBOX CONTROL DEVICE
Roger Blavette, Rueil-Malmaison, France, assignor to Societe anonyme dite: Societe des Automobiles Simca, Paris, France
Filed Jan. 29, 1968, Ser. No. 701,220
Claims priority, application France, Feb. 3, 1967, 93,695; Nov. 29, 1967, 130,221
Int. Cl. G05g 9/02
U.S. Cl. 74—473     5 Claims

ABSTRACT OF THE DISCLOSURE

A gearbox control device for a front wheel drive vehicle, in which the engine is located under the driving seat and the gearbox has a rotatable slidable control rod directed towards the front of the vehicle. A gear lever is mounted on the vehicle floor by means of a first swivel joint so that it may be pivoted longitudinally and transversely of the vehicle, the lever having at one end a clevis on which is pivoted one end of a bar fixed at its other end to the rod of a second swivel joint disposed in a spherical housing shaped to conform to and receiving the end portion of a link pivoted at its other end on the end of the gearbox control rod. The rod of the second swivel joint carries in a pivoted manner one end of a second link whose other end is pivoted on the rod of a third swivel joint pivotally mounted in a spherical housing fixed to the vehicle chassis.

---

This invention relates to a gearbox control device.

Various gearbox control devices are already known and used in front wheel drive vehicles in which the engine is situated in front of the driving seat. However, when the engine is located under the driving seat and the gearbox is directed towards the front of the vehicle, it is very difficult to use the known devices in a simple and rational manner.

The device of the present invention is intended to control such a gearbox for a front wheel drive vehicle having the engine under the driving seat. This device, which includes a minimum for elements, is simple and permits easy control of the gears by virtue of a practically direct transmission between the gear change lever and the gear control rod mounted on the gearbox.

According to the present invention, a gearbox control device, particularly for a front wheel drive vehicle, in which the engine is located substantially under the driving seat and the gearbox has a rotatable slidable control rod directed towards the front of the vehicle, comprises a gear lever mounted on the vehicle floor by means of a first swivel joint whereby it may be pivoted longitudinally and transversely of the vehicle, the lever having at one end a clevis on which is pivoted one end of a bar fixed at its other end to the rod of a second swivel joint disposed in a spherical housing shaped to conform to and receiving the end portion of a link pivoted at its other end on the end of the gearbox control rod, the rod of the second swivel joint carrying in pivoted manner one end of a second link whose other end is pivoted on the rod of a third swivel joint pivotally mounted in a spherical housing fixed to the vehicle chassis.

In order that the invention may be more fully understood, some embodiments in accordance therewith will now be described, by way of example, with reference to the accompanying drawings in which:

FIG. 1 is a schematic view of the driving position of a vehicle showing the location of the gearbox and its control with respect to the driving seat.

FIG. 2 is an elevational view of the gearbox control device of the invention.

FIG. 4 is a schematic view of the driving position of a vehicle showing the arrangement of the gearbox and its control with respect to the driving seat.

FIG. 5 is an elevational view of a variant of the gearbox control device.

Figure 3:
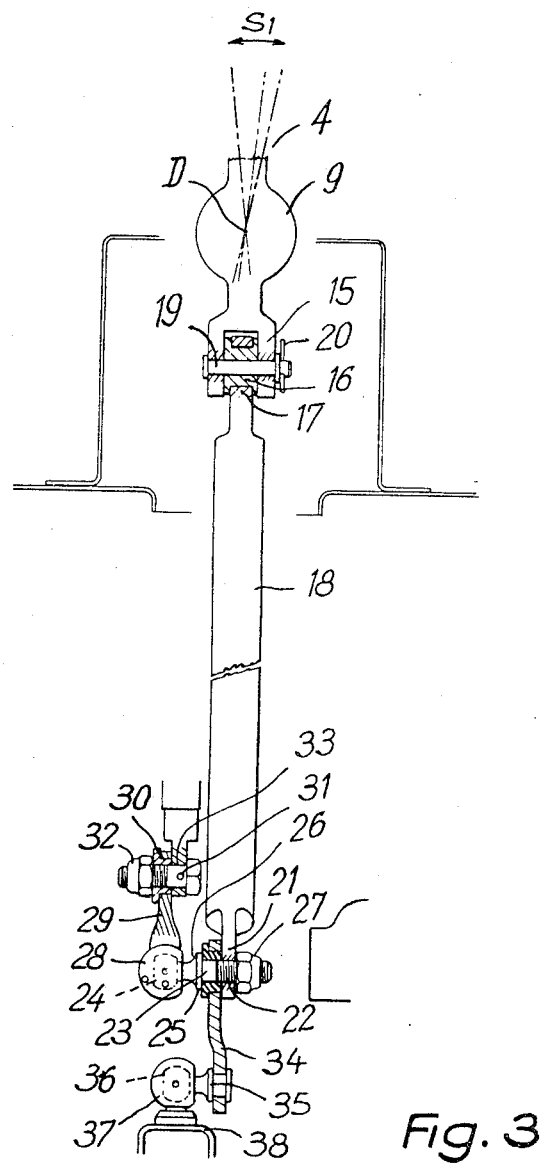
FIG. 3 is an elevational view of the control device turned through 90° with respect to FIG. 2.

There is shown in FIG. 1 the driving position of a vehicle including a seat 1 mounted on a floor 2, a steering wheel 3 and a gear change lever 4 mounted on the floor 2 so as to pivot longitudinally and transversely of the vehicle.

The engine 5 of the vehicle is located under the driving seat, the gearbox 6 being directed towards the front of the vehicle and the front wheels 7 being located forwardly of the seat 1. The gearbox 6 has, in known manner, a gear control rod 8 which can slide as shown by the double arrow P for gear changing and can pivot about its axis as shown by the arrow S for gear selection (FIG. 2).

In FIGS. 2 and 3 there is shown the control device of the invention which comprises a lever 4 pivoted on the floor 2 by a first swivel joint 9 rotatably mounted in a half housing 10 fixed to the floor 2 by screws 11 and in a half housing 12 subjected to the action of a spring 13 bearing on the bottom of a casing 14 also fixed to the floor 2 by screws 11.

The lever 4 which extends through the floor 2 has, at one end, a clevis 15 between the cheeks of which is pivoted on a ring 16 the end 17 of a bar 18, said ring 16 being fixed to the clevis 15 by a pin 19 provided with a split pin 20.

The other end 21 of the bar 18 has a hole 22 whereby the bar is engaged on a threaded rod 23 of a second swivel joint 24, the end 21 of the bar being held clamped against a ring 25, itself bearing against a shoulder 26 of the rod 23, by a screw 27 screwed onto the threaded portion of the rod 23. The swivel joint 24 is rotatably mounted in a spherical housing 28 conforming to and receiving one end of a link 29 of which the other end is pivoted on the end of the gear control rod 8 by a ring 30 engaged on a screw 31 having a nut 32 and mounted in a hole 33 provided in the end of the rod 8.

The ring 25 engaged on the rod 23 receives in pivoted manner one end of a second link 34 of which the other end is pivoted on a rod 35 of a third swivel joint 36 rotatably mounted in a spherical housing 37 rigid with a shaped plate 38 fixed to a cross-member 40 of the chassis by screws 39.

The pivot points A, B and C corresponding respectively to that of the rod 35 of the third swivel join, to that of the pivot point on the control rod 8 and that of the rod 23 of the second swivel joint 24, are parallel and disposed at the apices of a triangle whose plane is substantially perpendicular to the said pivot points.

The axis of the gear control rod 8 is perpendicular to the axis A of the rod 35 rigid with the swivel joint 36.

The axis of the bar 18 is substantially parallel to the straight line joining the pivot point D of the swivel joint 9 to the pivot point A of the rod 35.

In order to change gear, the lever 4 is operated as shown by the double arrow P1 which causes the swivel joint 9 to pivot about its point D about an axis parallel to the axis 19 so that the quadrilateral ADEC is deformed.

The bar 18 is pivoted on the clevis 15 and being rigid with the rod 23 of the first swivel joint 24 transmits its forward or rearward movement by means of the link 29 to the rod 8 which slides longitudinally in the gear box 6 as shown by the gear change indicating arrow P.

In order to select a gear, the lever 4 is operated as shown by the arrow S1 (FIG. 3) so as to be brought into one of the positions shown in broken lines in FIG. 3, so that the assembly constituted by the bar 18, the second link 34, and the link 29 pivots angularly in the same way as the lever 4, the pivoting taking place laterally about the swivel joint 9 and the second swivel joint 36 due to the axis of the bar 18 being parallel to the straight line joining the pivot point D of the swivel joint 9 to the axis A of the swivel joint 36.

Since the rod 23 of the swivel joint 24 is rigid with the bar 18 and the second link 34, it is moved by the latter elements and communicates its pivotal movement to the rod 8 by the link 29. In this way, the rod 8 pivots about its axis as shown by the arrow S for the selection of gears.

In FIG. 4 there is shown an alternative embodiment which includes as previously a driving position having a seat 1 mounted on the floor 2, a steering wheel 3 and a gear lever 4 pivotally mounted, as before, on the floor 2.

Under the seat 1 and the floor 2 is disposed an engine 5 of which the gearbox 6 is directed towards the front of the vehicle. The gearbox 6 has a gear control rod 8 which can slide as indicated by the double arrow P and can pivot about its axis as shown by the arrow S.

Figure 6:
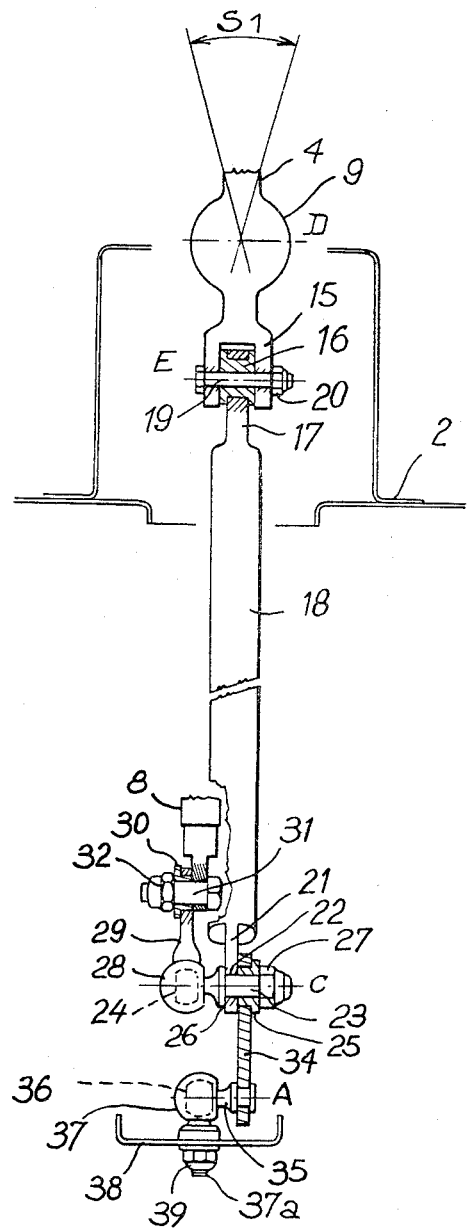
FIG. 6 is an elevational view of the control device turned through an angle of 90° with respect to FIG. 5.

In FIGS. 5 and 6 is shown another embodiment of the control device which comprises a lever 4 pivoted on the floor 2 by a first swivel joint 9 as described and shown above.

The lever 4 has at one end a clevis 15 between the cheeks of which is pivoted, on a ring 16, the end 17 of a bar 18, the ring 16 being mounted on the clevis by a screw 19 and nut 20.

The other end 21 of the bar 18 has a hole 22 whereby it is engaged on a threaded rod 23 of a second swivel joint and held against a shoulder 26 of the threaded rod by a screw 27 and a ring 25.

The swivel joint 24 is pivotally mounted in a spherical housing 28 conforming to the end of a link 29 whose other end is pivoted on the end of the gear control rod 8 by a ring 30 and a screw 31 having a nut 32.

The ring 25 engaged on the rod 23 receives in pivoted manner one end of a second link 34 whose other end is pivoted on the rod 35 of a third swivel joint 36 pivotally mounted in a spherical housing 37 fixed on a shaped plate 38 rigid with a cross-member 40 of the chassis by a nut 39 screwed on to the threaded rod 37a of the housing 37.

In this embodiment shown in FIGS. 4, 5 and 6, the fixing point of the spherical housing 37 on the shaped plate 38 is different from that shown and described above.

The second swivel joint 24 is located above the axis of the rod 8, whereas previously this joint was situated below such axis.

The result of this is that the deformable quadrilateral of which the corners ACDE are formed respectively by the axis of the rod 35 of the third swivel joint, the axis of the rod 23 of the second swivel joint, the pivotal axis of the first swivel joint 9 parallel to the axis 19 and the axis 19 itself, has a diagonal EC which is formed by the axis of the control bar 18.

The operation of the control device thus modified is identical with that described above. For changing gear, the lever 4 (FIG. 5) is actuated as shown by the double arrow P1, which causes the swivel joint 9 to pivot about the axis D and a forward or rearward movement to be transmitted by the bar 18 and the link 29 to the rod 8 which slides longitudinally in the gearbox 6 as shown by the gear change indicating arrow P.

For gear selection, the lever 4 is operated as shown by the arrow S1 (FIG. 6) so that the assembly constituted by the bar 18, the second link 34 and the link 29 pivots angularly about the swivel joints 9 and 36. Because of the lever arm existing between the point C and the axis of the rod 8 which is perpendicular to the axis of the rod 35 of the third swivel joint 36, the angular displacement of the second swivel joint 24 causes rotation of the rod 8 in the manner shown by the arrow S for the selection of gears.

Naturally, the invention is not limited to the embodimenst described and shown, but covers all other variants thereof without departing from its scope.

What is claimed is:

1. A gearbox control device, particularly for a front wheel drive vehicle, in which the engine is located substantially under the driving seat and the gearbox has a rotatable slidable control rod directed towards the front of the vehicle, comprising a gear lever mounted on the vehicle floor by means of a first swivel joint whereby it may be pivoted longitudinally and transversely of the vehicle, the lever having at one end a clevis on which is pivoted one end of a bar fixed at is other end to a rod of a second swivel joint disposed in a spherical housing shaped to conform to and receiving the end portion of a link pivoted at its other end on the end of the gearbox control rod, the rod of the second swivel joint carrying in pivoted manner one end of a second link whose other end is pivoted on a rod of a third swivel joint pivotally mounted in a spherical housing fixed to the vehicle chassis.

2. A control device according to claim 1 wherein the axes of the swivel joint rods and that of the link pivot on the gear control rod of the gearbox are parallel and disposed at the apices of a triangle whose plane is substantially perpendicular to the said axes.

3. A control device according to claim 1 wherein the extension of the axis of the gearbox control rod is perpendicular to the axis of the rod of the third swivel joint.

4. A device according to claim 1, wherein the axis of the control bar is parallel to the straight line which connects the pivot point of the first swivel joint to the axis of the rod of the third swivel joint.

5. A control device according to claim 1, wherein the axis of the control bar constitutes the diagonal of a deformable quadrilateral of which two parallel sides are constituted respectively by the straight line connecting the axis of the first swivel joint to the axis of the rod of the second swivel joint and by the straight line connecting the pivotal axis of the bar on the gearchange lever to the axis of the rod of the third swivel joint.

References Cited

UNITED STATES PATENTS

| 2,040,594 | 5/1936 | Bixby | 74—473 |
| 2,390,711 | 12/1945 | Holmstrom | 74—473 |
| 3,269,208 | 8/1966 | Whitchurch | 74—473 |
| 3,417,634 | 12/1968 | Dangauthier | 74—473 |

MILTON KAUFMAN, Primary Examiner